United States Patent [19]

Sieghartner

[11] Patent Number: 5,137,418
[45] Date of Patent: Aug. 11, 1992

[54] FLOATING SELF-CENTERING TURBINE IMPELLER

[75] Inventor: Leonard J. Sieghartner, Coal Valley, Ill.

[73] Assignee: Roy E. Roth Company, Chicago, Ill.

[21] Appl. No.: 632,166

[22] Filed: Dec. 21, 1990

[51] Int. Cl.⁵ .................. F04D 29/04; F16C 32/06
[52] U.S. Cl. .................. 415/55.1; 415/106; 384/121; 384/113
[58] Field of Search .............. 415/52.1, 55.1, 55.2, 415/55.3, 106, 107; 384/121, 113, 114

[56] References Cited

U.S. PATENT DOCUMENTS

| | | | |
|---|---|---|---|
| 4,227,753 | 10/1980 | Wilcock | 384/121 |
| 4,248,571 | 2/1981 | Sieghartner | |
| 4,348,065 | 9/1982 | Yoshioka et al. | 384/121 |
| 4,586,877 | 5/1986 | Watanabe et al. | 415/55.1 |
| 4,734,008 | 3/1988 | Roth | |
| 4,793,766 | 12/1988 | Kumata | |
| 4,854,830 | 8/1989 | Kozawa et al. | |
| 4,872,806 | 10/1989 | Yamada et al. | |
| 4,915,582 | 4/1990 | Nishikawa | |
| 4,923,365 | 5/1990 | Rollwage | |
| 4,938,659 | 7/1990 | Bassler et al. | |
| 5,000,584 | 3/1991 | Simmons | 384/114 |

Primary Examiner—Edward K. Look
Assistant Examiner—Michael S. Lee
Attorney, Agent, or Firm—Emrich & Dithmar

[57] ABSTRACT

A floating, self-centering impeller for a turbine pump assembly has a plurality of "D-shaped" recesses arranged in one or more circumferential rows on its end surfaces to induce pressurized film between its end surfaces and adjacent thrust surfaces of side plates to prevent galling or seizing of the pump as the impeller is rotated. A corresponding array of such "D-shaped" recesses may be provided on the opposing surfaces of the side plates.

38 Claims, 5 Drawing Sheets

DIRECTION OF MOTION

DIRECTION OF MOTION

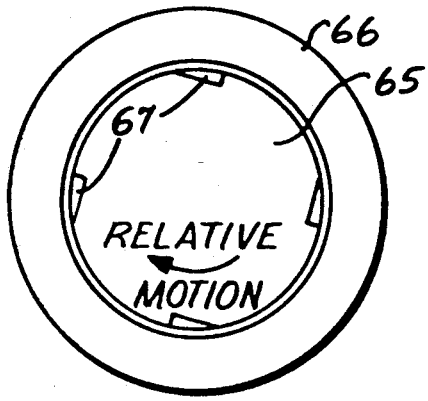
FIG.10
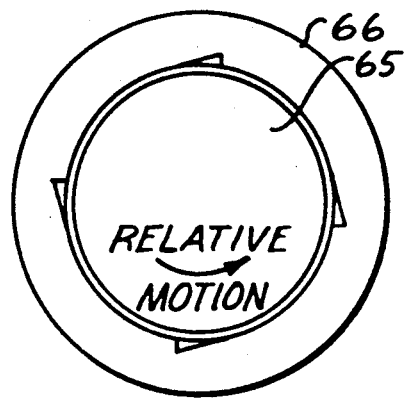
FIG.10A
FIG.10B
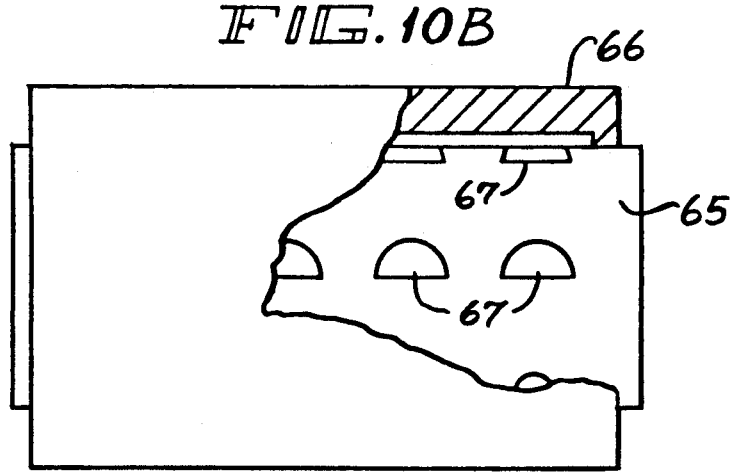

FLOATING SELF-CENTERING TURBINE IMPELLER

BACKGROUND OF THE INVENTION

This invention relates to an arrangement for inducing pressurized film between rotating non-fixed location impellers or discs and adjacent sealing or thrust surfaces in turbine pumps and the like.

In the normal construction of a regenerative turbine pump, a disc-shaped impeller with the normal vanes milled in the periphery of the disc rotates within the confines of liners or heads. Typically the clearance between the sealing surfaces of the liners and the sealing surfaces of the impeller is in the order of 0.001 inch to 0.006 inch per side depending on the model and material of construction. A lesser clearance is provided when non-galling material is used, and on smaller models. A greater clearance is provided when galling material is used, and on larger models.

Because there is a difference in hydraulic pressure from one side of the impeller to the other (often a ½ to 1 pound difference), a non-fixed location impeller is forced to one side and into engagement with the liner, causing rubbing and wear and in the case of some galling materials, actual seizing of the pump. To alleviate this condition, it has been customary to drill "balancing" holes near the hub of the impeller to equalize the pressure. This solution has not been entirely successful because the spinning of the impeller offers too much resistance to the fluid flow. Forming the impeller with variously shaped slots close to the hub has also been attempted, but has not been entirely successful.

The most successful method of preventing galling has been to lock the impeller on the shaft with a nut on the end of the shaft or to use a lock collar to locate the impeller axially on the shaft in the instance of multistage pumps. The final adjustment is done with threaded collars on the shaft or in the housing or shimming. This, however, is a painstaking and costly process during manufacturing, assembly and in servicing of the unit. Varying temperatures and load conditions can cause differential expansion between the casing, frame and shaft. This makes wear and/or seizure likely.

SUMMARY OF THE INVENTION

It is therefore an object of the present invention to provide an arrangement for inducing pressurized film between non-fixed location rotating impellers or discs and/or adjacent sealing or thrust surfaces.

Another object of the present invention is to provide an improved floating, self-centering turbine impeller.

Yet another object of the present invention is to provide an improved impeller for use in turbine pumps and the like.

Another object of the present invention is to provide an impeller assembly which possesses greater efficiency attainable since clearances can be reduced because the effects of differential expansion are eliminated.

A further object of the present invention is to provide improved side plates for use in turbine pumps and the like.

These and other objects are achieved by the present invention which provides an impeller assembly for conveying a medium. The impeller assembly comprises an impeller including a disc-shaped member having first and second end surfaces, and enclosing means at least partially enclosing the impeller and defining first and second fixed surfaces opposing the first and second end surfaces of the impeller. The impeller is rotatable within the enclosing means and has a plurality of vane-shaped conveying elements generally on a periphery of the disc-shaped member, each end surface having a sealing surface portion. Each sealing surface portion has a plurality of recesses formed therein. The recesses are disposed in at least one circumferential row, and each of the recesses has an arcuate semicircular leading edge and a straight-line trailing edge with the semicircular leading edge being oriented in the direction of rotation of the impeller. In accordance with one preferred embodiment of the invention, the recesses are generally "D"-shaped. The recesses can be provided in the impeller, or in the fixed surfaces or in both the impeller and the fixed surfaces.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIGS. 10, 10A and 10B are simplified representations of concentric members adapted for relative motion and which include pressure notches in accordance with the present invention.

DESCRIPTION OF A PREFERRED EMBODIMENT

Figure 1:
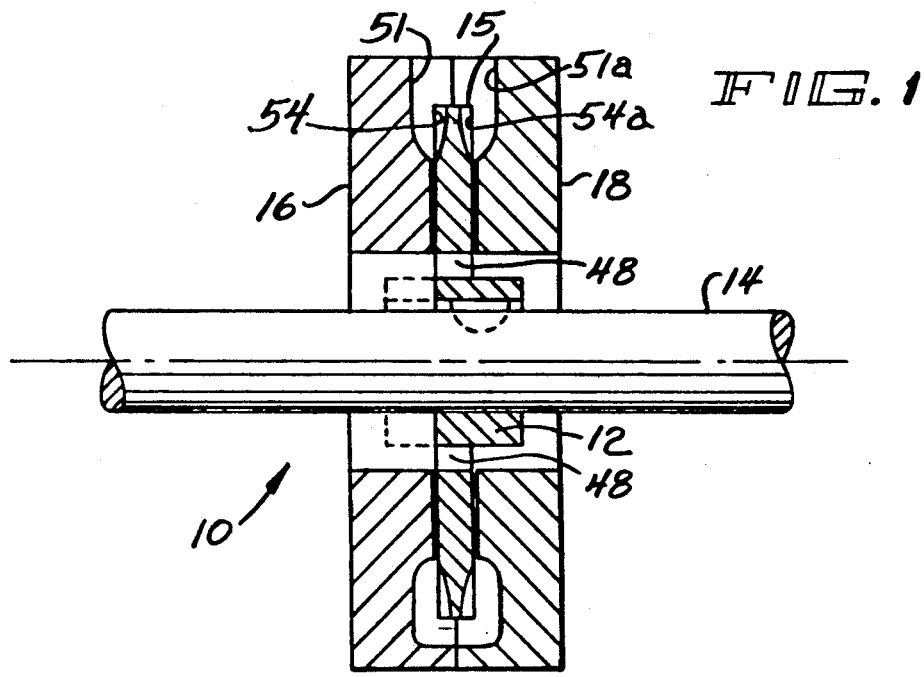
FIG. 1 is a simplified representation of an impeller assembly including a shaft, an impeller, and inner and outer side plates which define fixed surfaces between which the impeller is rotated.

Referring to FIG. 1 of the drawings, there is illustrated a simplified representation of an impeller assembly 10 for a turbine pump and the like, including an impeller 12 mounted on a shaft 14 for rotation within a chamber or cavity 15 defined by a pair of side plates 16 and 18 which define the space wherein the impeller rotates, as is known in the art. The impeller assembly conveys a medium from an inlet to an outlet of the impeller, increasing the pressure of the fluid at the outlet assembly, as is known in the art. The impeller 12 is shown oriented horizontally in FIG. 1, but could be oriented vertically. Also, the arrangement of the present invention can be used on single stage pumps or multi-stage pumps and it is within the scope of the present invention that the novel arrangement in accordance with the present invention may be utilized between any rotating and fixed surface. When the impeller 12 is assembled with the side plates 16 and 18, the clearance between the impeller and sealing surface may be in the range of 0.004 inch to 0.010 inches. By way of illustration, the arrangement of the present invention is described with reference to a turbine pump, but the arrangement can be used anywhere a disc or collar is rotated between fixed surfaces, which may be sealing surfaces and/or thrust surfaces.

Figure 2:
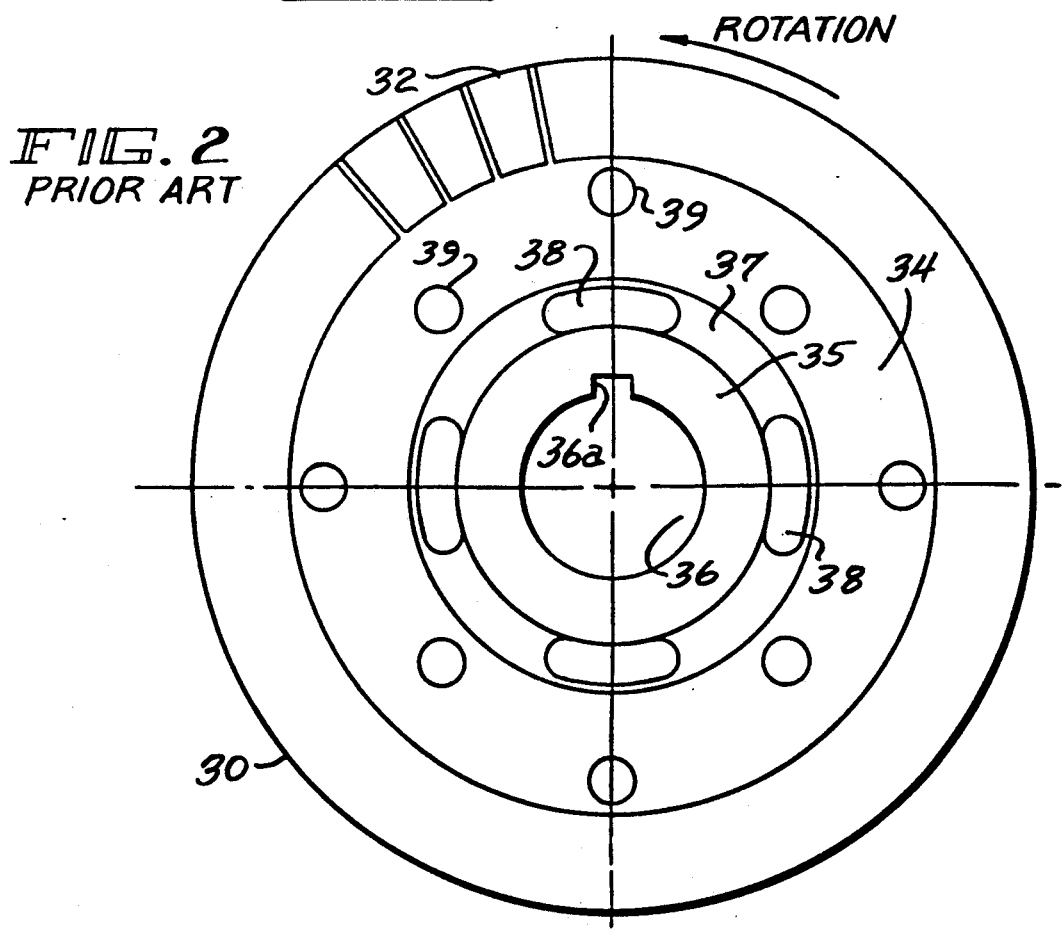
FIG. 2, which is labeled prior art, illustrates an impeller having a plurality of balancing holes and pressure relief slots formed in its side surfaces.

Referring now to FIG. 2, which is labeled "prior art", non-fixed location impellers heretofore used in turbine pumps have axial balancing holes through the body of the impeller and arcuate grooves or indentations in both end surfaces. For example, in FIG. 2, there is shown an impeller 30 which has a plurality of vanes 32 at the outer periphery and end surface 34 which forms a close clearance with the inner surfaces of the side plates within which it rotates. The central portion of the impeller 30 defines a hub portion 35 having a bore 36 adapted to axially movably receive a reduced inner end of a drive shaft. The bore 36 has a key slot 36a to permit the impeller to be keyed to the shaft and movable axially along the shaft. The impeller 30 is formed at an intermediate annular portion 37 thereof circumferentially equally spaced, arcuate recesses 38, in the shape of arcuate holes. The impeller 30 is further formed with a plurality of circumferentially equally spaced pressure balancing holes 39 extending axially therethrough. The associated side plates (not shown) may have grooves formed therein and located to oppose the holes and/or grooves in the impeller.

As is known, the arcuate holes 38 and/or the axial holes 39 cooperate with the inner surfaces of the side plates within which the impeller rotates to cause a pressure distribution to reduce the thrust force acting on each of the opposite faces of the impeller 30 to minimize frictional engagement of the impeller surfaces with the opposing internal walls of the housing or side plates. It has been found that the use of balancing holes 39 near the hub of the impeller and/or the use of slots 38 has not been entirely successful in preventing galling of the impeller in use.

Figure 3:
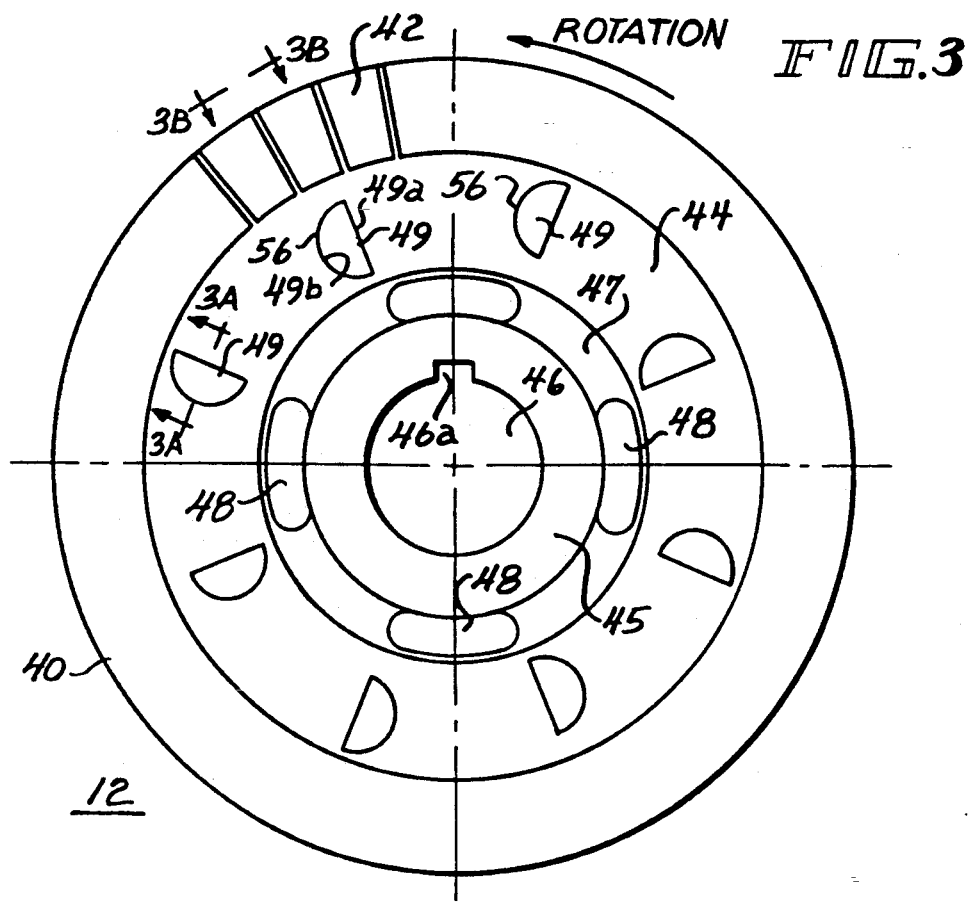
FIG. 3 is an end view of an impeller provided in accordance with the present invention.
Figure 3A:
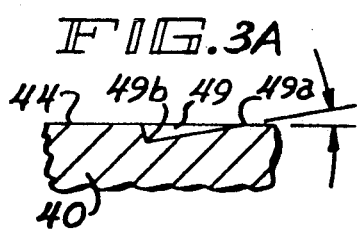
FIG. 3A is a sectional view taken along the lines 3A—3A of FIG. 3.
Figure 3B:
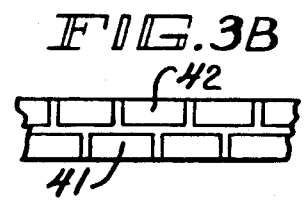
FIG. 3B is a fragmentary view taken along the lines 3B—3B of FIG. 3.

Referring to FIGS. 1 and 3, the impeller 12 provided in accordance with the present invention comprises a disc-shaped member 40 having peripheral vanes 42 as shown in FIG. 3B, an end surface 44, a central hub 45 having a bore 46 and adapted to axially movably receive drive shaft 14. The bore 46 defines a key slot 46a, permitting the impeller to be keyed by key 46b (or splined) to the shaft, but be movable axially along the shaft. That is, the impeller is floating or has a non-fixed location in the axial direction of the shaft. The hub 45 may be provided on either side or both sides of the disc. The impeller 12 has an intermediate annular portion 47 having arcuate holes 48 formed therein. However, in the circumferential portion intermediate the portion 47 and the vanes 41, there are provided eight recesses or pressure notches 49, each having a generally "D"-shaped configuration oriented in the direction of rotation of the impeller, which is counterclockwise when viewed in FIG. 3. Each pressure notch has a straight line portion 49a and an arcuate, semicircular portion 49b. Although in the exemplary embodiment, eight such notches 49 are provided, it is apparent that a greater or lesser number of recesses may be provided. The notches 49 are deployed or arranged in concentric rows of four notches each, with alternate notches being spaced from the edge of the end surface inwardly, a predetermined distance in the range for example, 1/16 to 3/32 of an inch. The notches in the two rows are staggered to sweep the entire surface of the disc. The notches are spaced apart equally at 45° separations. The radial length of the straight line portion 49a of the notch 49 is one-half inch, for example, for an impeller having a diameter of five and one-half inches. The other end surface 44a of the disc 40 has a corresponding pattern or configuration, which is complementary to, i.e., the mirror image of the pattern of recesses and grooves in surface 44.

Figure 3C:
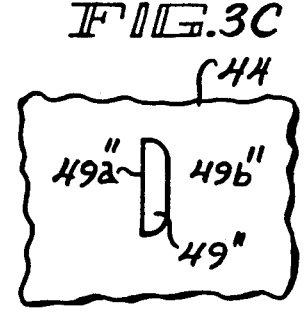
FIG. 3C is an enlarged fragmentary view of a portion of an impeller illustrating a modified configuration for the notches.

Referring to FIG. 3A, the arcuate portion 49b of the notch 49, which forms the leading edge for the notch 49, extends deeper into the surface 44 of the disc 40 than the straight line portion 49a which forms the trailing or rearward edge of the notch 49. The angle of inclination of the notch surface may be five degrees more or less. The radius of the curved portion 49b is tailored to the diameter of the end surface of the disc 40. While the notches 49 are illustrated as being generally "D"-shaped, other shapes are possible, such as the elongated generally oval shape as illustrated in FIG. 3C for notch 49". The main consideration is the straight line trailing edge 49a" which provides the "pinch point" of the notch. The impeller may be made of stainless steel, galling material or the like. The notches 49 are formed using small end milling or any other suitable technique.

Figure 4:
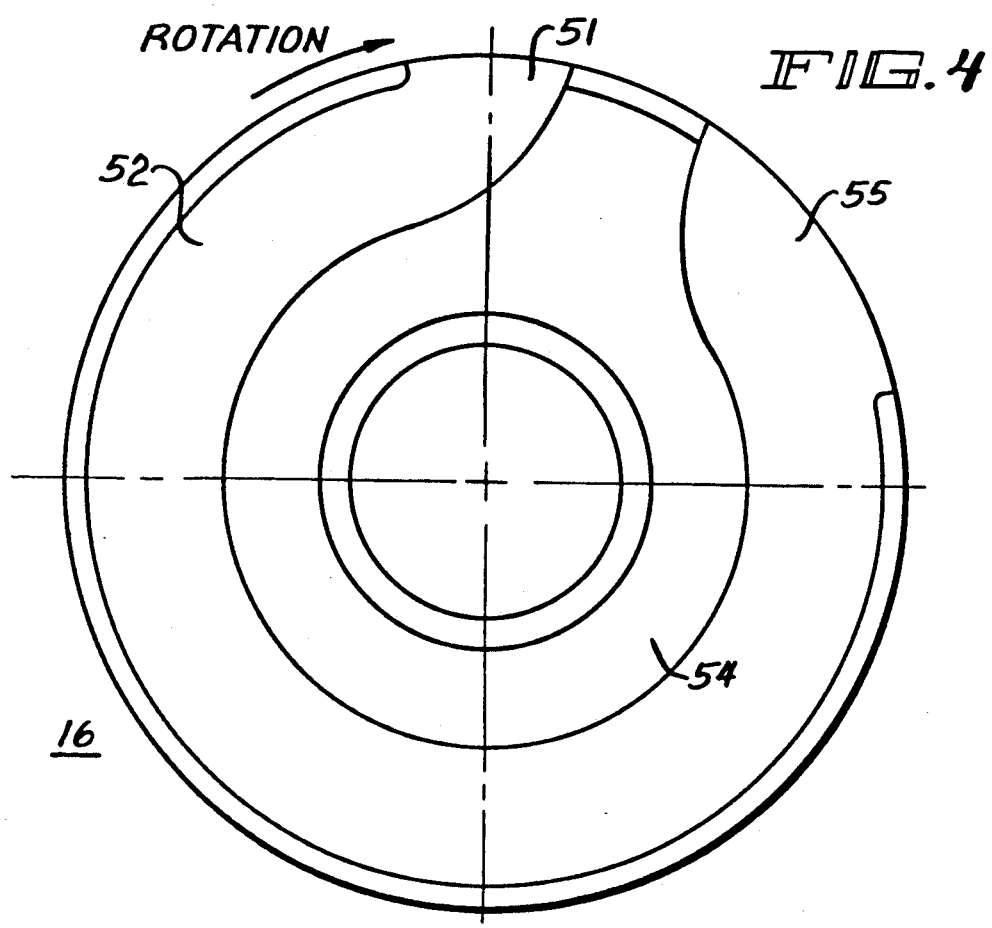
FIG. 4 is an end view of one liner of a pair of liners for use with the impeller illustrated in FIG. 3.

Referring to FIG. 4, there is illustrated one of the side plates 16 of the pair of liners 16 and 18 which are used with the impeller 12. The side plate 16 is an annular member formed with a radial notch 51 which is directed radially inwardly and communicates with a channel 52. Channel 52 communicates with radial notch 55. The side plate has a raised annular inner surface 54 defining a thrust surface for the side plate. The second liner 18 of the pair of liners is similar to side plate 16 but complementary in configuration of the notches and channels to those of side plate 16. Notch 51 together with a corresponding notch 51a on side plate 18 (FIG. 1) defines the fluid inlet for the turbine impeller assembly. Notch 55 together with a corresponding notch (not shown) on side plate 18 defines the fluid outlet.

Figure 5:
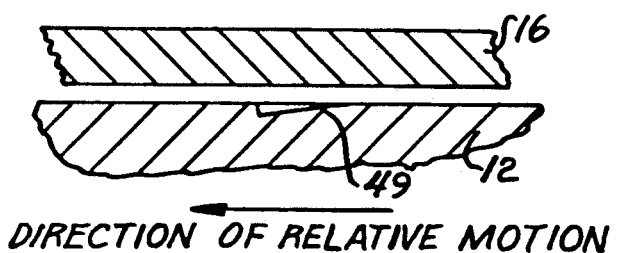
FIG. 5 is an enlarged fragmentary view illustrating the orientation of notches in the impeller relative to the direction of motion.
Figure 6:
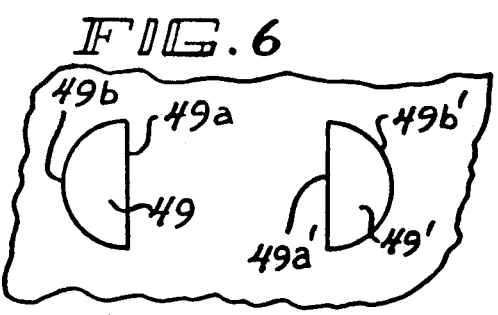
FIG. 6 is an enlarged fragmentary view of a portion of an impeller illustrating a further embodiment for notches allowing bidirectional rotation for the impeller.

Referring to FIGS. 1, 3 and 6, in operation, as the impeller 12 is rotated on shaft 14 and fluid is supplied to the inlet of the impeller assembly defined by cooperating radial notches 51 and 51a of the side plates 16 and 18, the notches 49 cause a build up of hydraulic pressures at the point line 49a, which point defines the "pinch point" of each notch. The liquid or gas being pumped is "pinched" in the direction of rotation of the impeller 12 relative to the liner as illustrated in FIG. 5. The film velocity creates a pressure at the "pinch point". This causes a pressurized film on both sides of the impeller disc 40, preventing metal-to-metal contact between sealing surfaces 44, 44a of the impeller disc 40 and the sealing surfaces 54, 54a of the liners 16 and 18. This phenomenon was observed while the impeller of an impeller assembly having recesses in accordance with the present invention was rotated, relative to a pair of side plates, at speeds of 1750 revolutions per minute and 3500 revolutions per minute. The impeller 12 is self-centering and if, at start up, the impeller is closer to one side plate sealing surface than the other side plate surface, the impeller will move axially to be centered on the shaft.

Figure 7:
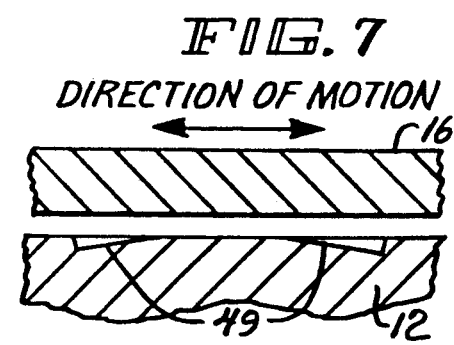
FIG. 7 is an enlarged fragmentary view illustrating the orientation of the notches of the impeller of FIG. 6 relative to the direction of motion.

Referring to FIGS. 6 and 7, there is illustrated an alternative configuration for the notches wherein two pressure notches 49 and 49' are provided for each single notch for the embodiment illustrated in FIG. 3. The notches 49 and 49a each have a straight-line portion 49a and 49a', respectively, and a curved portion 49b and 49b'. This configuration for the recesses permits bidirectional rotation of the impeller (or side plates) while providing the required pressure balancing or compensation to maintain the impeller out of contact with the sealing surfaces of the side plates 16 and 18. The notches 49 are effective to produce the pressurized film for counterclockwise rotation of the impeller and notches 49' produce the pressurized film for clockwise rotation of the impeller.

Figure 8:
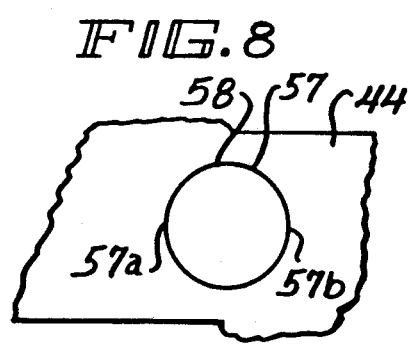
FIG. 8 is an enlarged fragmentary view of a further embodiment impeller having notches allowing bidirectional rotation of the impeller.
Figure 9:
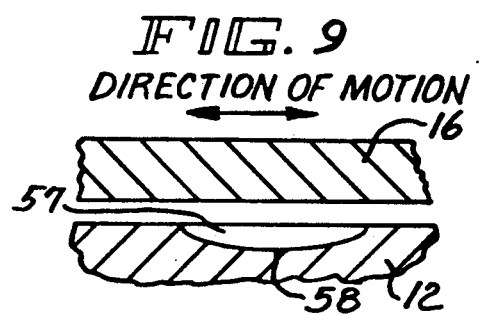
FIG. 9 is an enlarged fragmentary view illustrating the circular notch relative to the direction of motion.

Referring to FIGS. 8 and 9, in accordance with a further preferred arrangement, saucer-shaped or dish-shaped pressure notches 57 are provided on the surfaces of the impeller. As illustrated in FIG. 9, the center 58 of the notch 57 is the low point, with arcuate edge 57a and arcuate edge 57b (which forms the pressure point for counterclockwise rotation of the impeller) extending inwardly from the plane of the disc outer surface, inclined approximately five degrees from the outer edge to the center 58 of the recess 57 as illustrated in FIG. 9. This configuration for the recess provides pressure balancing for bidirectional motion of the impeller 12, i.e., for rotation of the impeller in either direction. The downward sloping sides of the notches 49 shown in FIGS. 3A, 5 and 7, for example, are linear, but these surfaces could be curved such as the surface 57a shown in FIG. 9.

In FIG. 10, there are illustrated concentric members, including an inner member 65 and an outer member 66, adapted for relative rotation and wherein pressure notches or grooves 67 are provided on the non-linear outer surface of the inner member 65. The pressure notches 67 are spaced apart 90° along the circumference of the member 65. By way of example, the members 65 and 66 are elongated cylindrical shaped members and a plurality of sets of four circumferentially spaced notches are provided along the length of the member 65 as illustrated in FIG. 10A. The notches may have various shapes such as the "D"-shape, the saucer shape, the oval shape, or back-to-back configuration as described hereinabove. Also, the notches can be provided in the outer surface of the inner member (FIG. 10), the inner surface of the outer member (FIG. 10B) or both. By way of a portion of example, the concentric members 65 and 66 can form an impeller assembly, a gear pump, a sleeve-type bearing, etc. or an axial thrust bearing.

Figure 11:
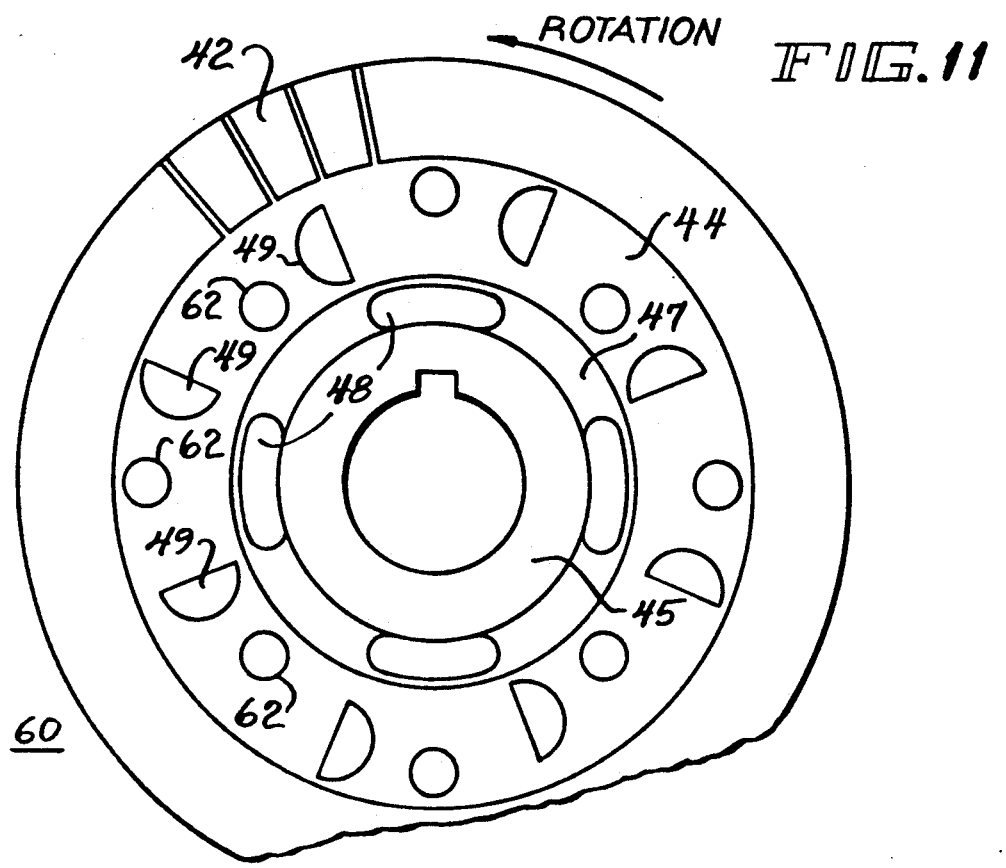
FIG. 11 is an end view of a further embodiment for an impeller provided in accordance with the present invention.

Referring now to FIG. 11, there is illustrated a further preferred embodiment for the impeller 60. Impeller 60 illustrated in FIG. 11 is similar to impeller 12 illustrated in FIG. 3, but further includes pressure balancing holes 62 interposed between adjacent notches 49.

While in the foregoing embodiments, notches have been provided in the surfaces of the impellers, the pressure notches may be cut in the faces of the sealing surfaces of the side plates as well as in the surfaces of the impellers, or in the surfaces of the impellers alone. By way of example, with reference to FIG. 12 there is illustrated a side plate 16' which includes a plurality of notches 71 formed in its sealing face 70 and disposed in a pattern similar to that for the notches formed in the impeller 12, but sixteen notches are provided in the side plate 16' arranged in two concentric rows of eight notches 71 each. A further notch 72 is provided in the raised sealing surface portion 73 that separates the inlet defining notch 74 and the outlet forming notch 75. The other side plate of the pair has a surface including recesses in a pattern complementary to that of side plate 16'.

Figure 12:
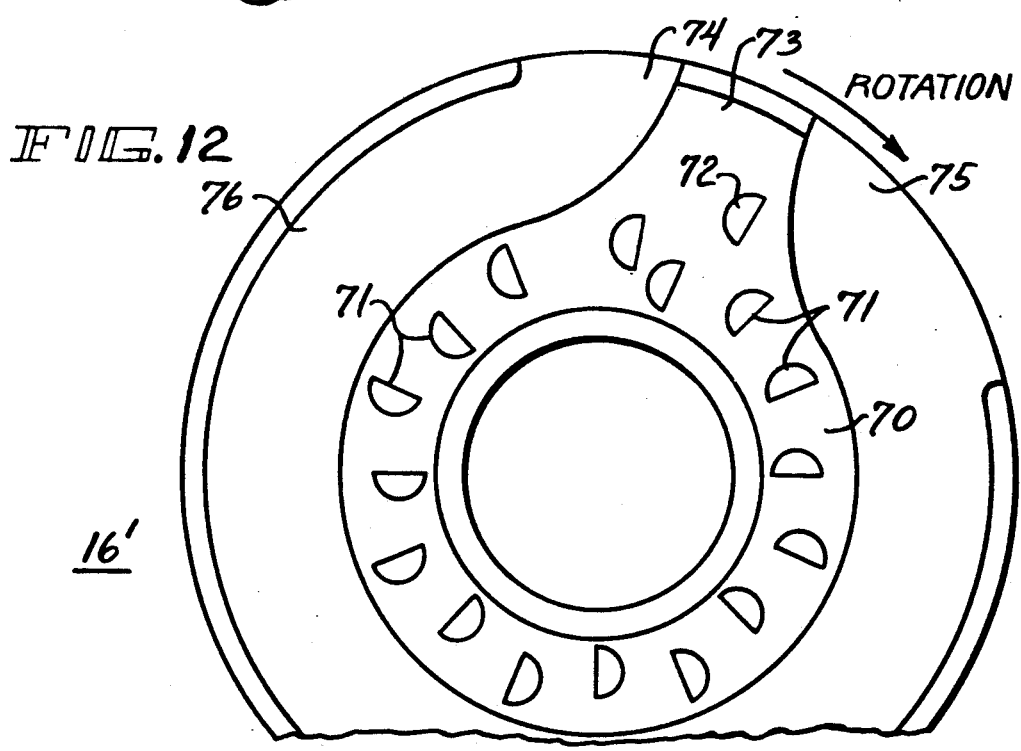
FIG. 12 is an end view of one liner of a pair of side plates for use with the impellers provided by the present invention.

The side plate 16' illustrated in FIG. 12, and its complement, may be used with each of the impellers illustrated, including the impellers described above with reference to FIGS. 3-9 and 11. Moreover, the side plate 16' and its complement, may be used with the prior art impeller 30 illustrated in FIG. 2, for example, and the notches 71 in the impeller 16' will cooperate with the balancing holes 39 in the impeller 30 to provide the desired result of preventing frictional engagement between the impeller end surfaces and the sealing surfaces of the side plate 16' and its complement.

An impeller assembly which included the impeller 60 shown in FIG. 11 and a pair of side plates having a configuration such as that for side plate 16' shown in FIG. 12, one liner being the complement of the other as is known, was constructed with the turbine assembly oriented in a horizontal position. Both side plates and impellers were made of 316 stainless steel. The impeller assembly was used to pump Milan municipal water. The pump was run for 200 hours at various pressures. Then the turbine assembly was removed and installed in a multi-stage pump, in a vertical orientation, and run an additional forty hours. After that, the turbine assembly was removed and disassembled. An examination of the impeller and liners revealed no scoring or galling. As is indicated hereinabove, an impeller constructed in accordance with the present invention and rotated at speeds of 1750 revolutions per minute and 3500 revolutions per minute caused a pressurized film to be produced on both sides of the impeller, preventing metal-to-metal contact between the impeller and fixed surfaces on both sides of the impeller.

In another test, a turbine assembly employing the impeller 30 shown in FIG. 2, was found to gall up and seize within minutes.

I claim:

1. In an assembly including a rotatable member which is rotated between fixed surfaces for conveying a fluid, said member having first and second side surfaces, the combination comprising: enclosing means at least partially enclosing said member and defining first and second fixed surfaces opposing said first and second side surfaces of said member, mounting means mounting said member within said enclosing means for rotation therewithin about a fixed axis, each side surface of said member including a sealing surface portion having an outer edge and an inner edge with said inner edge including a hub portion for coupling to said mounting means, each sealing surface portion having a plurality of recesses therein which are disposed in at least one annular and substantially symmetrical pattern, each of said recesses having an arcuate semicircular leading edge and a straight-line trailing edge with said trailing edge defining a pinch point of the recess, said pinch points of said recesses being substantially balanced and positioned radially about each of said sealing surface portions and located inwardly of said outer edge and said inner edge, whereby a portion of the fluid being conveyed is pinched at said pinch points as said member is rotated to provide a pressurized film of fluid between said sealing surface portions of said rotatable member and said first and second opposing fixed surfaces.

2. The assembly according to claim 1 wherein said recesses are disposed in first and second annular and substantially symmetrical patterns with alternate recesses staggered from pattern to pattern.

3. The assembly according to claim 1 wherein said recesses are aligned in pairs with the recesses of each pair arranged in back-to-back orientation whereby one recess of each pair has a trailing edge oriented in the direction of rotation of said rotatable member for clockwise or counterclockwise rotation.

4. The assembly according to claim 1 wherein said rotatable member is generally disc-shaped and has said mounting hub portion at its center and an annular surface portion between its mounting hub portion and its sealing surface portion, said annular surface portion including a plurality of arcuate recesses therein to provide balanced axial thrust reduction of said rotatable member and said first and second fixed surfaces.

5. The assembly according to claim 4 wherein said disc-shaped member has a plurality of openings therethrough communicating said sealing surface portions of said first and second end surfaces for equalizing pressures on said side surfaces.

6. The assembly according to claim 5 wherein each of said fixed surfaces includes a plurality of recesses therein, the pattern of recesses on said surfaces being a substantially mirror image of the pattern of recesses on the opposing side surfaces of said disc-shaped member.

7. The assembly according to claim 1 wherein substantially all of said pinch points are aligned along radial lines extending from the center of said rotatable member.

8. In an assembly for rotating a member relative to a fixed surface for conveying a fluid, the combination comprising: a first member, and a second member at least partially enclosing said first member, said first member having a surface opposing a surface of said second member, with one of said members being adapted for rotation about an axis relative to the other one of said members, and at least one of said opposing surfaces including a first edge and a second edge, with said at least one surface having a plurality of recesses therein, each of said recesses having a leading edge and a trailing edge, with said trailing edge defining a pinch point of the recess, said pinch points of said recesses being substantially balanced and positioned on at least one of said opposing surfaces to provide a pressurized film of fluid between said opposing surfaces as said one member is rotated about said axis, said recesses being radially positioned inwardly of said edges on said at least one surface and disposed in a symmetrical pattern to provide a discontinuous sealing surface free of any external supply of fluid to maximize the pressurized fluid film between said opposing surfaces during operation of said assembly and to prevent frictional engagement of said opposing surfaces.

9. The assembly according to claim 8 wherein said one opposing surface is planar and said recesses are disposed in at least one annular and substantially symmetrical pattern.

10. The assembly according to claim 9, wherein substantially all of said pinch points are aligned along radial lines extending from the center of said one member.

11. The assembly according to claim 8, wherein at least first and second ones of said recesses have their pinch points aligned along a first axis and third and fourth ones of said recesses have their pinch points aligned along a second axis, a portion of the fluid being conveyed being pinched at said pinch points as said member rotates, to provide a pressurized film of fluid between opposing surfaces of said first and second members.

12. The assembly according to claim 11 wherein said first axis and said second axis extend parallel to the axis of rotation of said one member.

13. The assembly according to claim 8 wherein said recesses are aligned in pairs with the recesses of each pair arranged in back-to-back orientation whereby one recess of each pair has a trailing edge oriented in the direction of rotation of said one member for clockwise or counterclockwise rotation.

14. The assembly according to claim 8 wherein said one member is cylindrical and said surface of said one member is nonlinear and said recesses are formed along the periphery of said one surface.

15. The assembly of claim 14, wherein said one member is a bushing of a sleeve-type bearing.

16. An impeller assembly for conveying a fluid comprising: an impeller including a rotatable member having first and second side surfaces, enclosing means at least partially enclosing said impeller and defining first and second fixed surfaces opposing said first and second side surfaces of said impeller, said impeller being rotatable within said enclosing means about a fixed axis and including a plurality of vane-shaped conveying elements on a periphery of the rotatable member, each side surface including a sealing surface portion having an outer edge and an inner edge with said inner edge including a hub portion, each sealing surface portion having a plurality of recesses therein, which are disposed in at least one annular and substantially symmetrical pattern, each of said recesses having a leading edge and a trailing edge with said trailing edge defining a pinch point of the recess, said pinch points of said recesses being substantially balanced and positioned radially about each of said sealing surface portions and located inwardly of said outer edge and said inner edge, whereby a portion of the fluid being conveyed is pinched at said pinch points as said impeller is rotated to provide a pressurized film of fluid between said sealing surface portions of said impeller and said first and second opposing fixed surfaces.

17. An impeller assembly according to claim 16 wherein said recesses are disposed in first and second annular and substantially symmetrical patterns with alternate recesses staggered from pattern to pattern.

18. An impeller assembly according to claim 16 wherein said recesses are aligned in pairs with the recesses of each pair arranged in back-to-back orientation whereby one recess of each pair has a trailing edge oriented in the direction of rotation of said rotatable member for clockwise or counterclockwise rotation.

19. The impeller assembly according to claim 16 wherein said rotatable member is generally disc-shaped and has said mounting hub portion at its center and an annular surface portion between its mounting hub portion and its sealing surface portion, said annular surface portion including a plurality of arcuate recesses therein to provide balanced axial thrust reduction of said rotatable member and said first and second fixed surfaces.

20. An impeller assembly according to claim 19 wherein said disc-shaped member has a plurality of openings therethrough communicating said sealing surface portions of said first and second side surfaces for equalizing pressures on said side surfaces.

21. The impeller assembly according to claim 19 wherein said enclosing means comprises first and second disc-shaped members defining said fixed surfaces, assembled together to define an inner chamber having a fluid inlet and a fluid outlet, said impeller being mounted within said chamber for rotation therewithin to move said fluid from said inlet to said outlet.

22. The impeller assembly according to claim 21 wherein each of said disc-shaped members includes a plurality of recesses therein, the pattern of recesses on said surfaces of said disc-shaped member being a substantially mirror image of the pattern of recesses on the opposing impeller surface.

23. The impeller assembly according to claim 16, wherein the pattern of recesses on the sealing surface portion of said first side surface is a substantially mirror image of the pattern of recesses on the sealing surface of said second side surface.

24. The impeller assembly according to claim 16, wherein the leading edge of each recess is recessed deeper into the sealing surface portion than is the trailing edge of each recess.

25. The impeller assembly according to claim 16, wherein each of said recesses is generally "D"-shaped and has an arcuate semicircular leading edge and a straight-line trailing edge.

26. The impeller assembly according to claim 16, wherein said recesses are generally saucer-shaped.

27. An impeller assembly for conveying a fluid comprising: an impeller including a disc-shaped member having first and second side surfaces, enclosing means at least partially enclosing said impeller and defining first and second fixed surfaces opposing said first and second side surfaces of said impeller, said impeller being rotatable within said enclosing means about a fixed axis and including a plurality of vane-shaped conveying elements on a periphery of the disc-shaped member, each side surface including a sealing surface portion having an outer edge and an inner edge with said inner edge including a hub portion, each sealing surface portion having a plurality of recesses therein which are disposed in at least one annular and substantially symmetrical pattern, the pattern of recesses on one of said sealing surface portions being a mirror image of the pattern of recesses on the other one of said surface portions, each of said recesses having an arcuate semicircular leading edge and a straight-line trailing edge with said trailing edge defining a pinch point of the recess, said pinch points of said recesses being substantially balanced and positioned radially about each of said sealing surface portions and located inwardly of said outer edge and said inner edge, whereby a portion of the fluid being conveyed is pinched at said pinch points as said member is rotated, to provide a pressurized film of fluid between said sealing surface portions of said rotatable member and said first and second opposing fixed surfaces.

28. An impeller for conveying a fluid comprising: a disc-shaped member having first and second side surfaces, a plurality of vane-shaped conveying elements on a periphery of the disc-shaped member, each side surface including a sealing surface portion having an outer edge and an inner edge, each sealing surface portion having a plurality of recesses therein which are disposed in at least one annular and substantially symmetrical pattern, said recesses having an arcuate semicircular leading edge and a straight-line trailing edge with said trailing edge defining a pinch point of the recess, said pinch points of said recesses being substantially balanced and positioned radially about each of said sealing surface portions and located inwardly of said outer edge and said inner edge.

29. The impeller assembly according to claim 28, wherein the pattern of recesses on the sealing surface portion of said first side surface is a substantially mirror image of the pattern of recesses on the sealing surface portion of said second side surface.

30. An impeller according to claim 19 wherein said recesses are disposed in first and second annular and substantially symmetrical patterns with alternate recesses staggered from pattern to pattern.

31. An impeller according to claim 28 wherein said recesses are aligned in pairs with the recesses of each pair arranged in back-to-back orientation whereby one recess of each pair has a trailing edge oriented in the direction of rotation of said disc-shaped member for clockwise or counterclockwise rotation.

32. An impeller according to claim 28 wherein said disc-shaped member has a mounting hub at its center and an annular surface portion adjacent to its mounting hub and including a plurality of arcuate recesses.

33. An impeller according to claim 28 wherein said disc-shaped member has a plurality of openings therethrough communicating said sealing surface portions for equalizing pressures on said first and second side surfaces.

34. An impeller according to claim 28 wherein said recesses are generally "D"-shaped.

35. A side plate for use with an impeller which is rotatable about a fixed axis for conveying a fluid comprising: a disc-shaped member having a sealing surface portion having an outer edge and an inner edge, said sealing surface portion having a plurality of recesses therein, which are disposed in at least one annular and substantially symmetrical pattern, each of said recesses having an arcuate semicircular leading edge and a straight-line trailing edge with said trailing edge defining a pinch point of the recess, said pinch points of said recesses being substantially balanced and positioned radially about said sealing surface and located inwardly of said outer edge and said inner edge.

36. The side plate according to claim 35 wherein said recesses are disposed in first and second annular and substantially symmetrical patterns with alternate recesses staggered from pattern to pattern.

37. The side plate according to claim 35 wherein said recesses are aligned in pairs with the recesses of each pair arranged in back-to-back orientation whereby one recess of each pair has a trailing edge oriented in the direction of rotation of the impeller for clockwise or counterclockwise rotation.

38. The side plate according to claim 35 wherein said recesses are generally "D"-shaped.

* * * * *